(12) United States Patent
Kim et al.

(10) Patent No.: US 10,835,893 B2
(45) Date of Patent: Nov. 17, 2020

(54) CATALYST CARRIER MODULE FOR LARGE-CAPACITY CATALYTIC REACTOR

(71) Applicant: AMOGREENTECH CO., LTD., Gimpo-si (KR)

(72) Inventors: Myoung Soo Kim, Seoul (KR); Tong Bok Kim, Gimpo-si (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 52 days.

(21) Appl. No.: 16/070,888

(22) PCT Filed: Feb. 3, 2017

(86) PCT No.: PCT/KR2017/001160
§ 371 (c)(1),
(2) Date: Jul. 18, 2018

(87) PCT Pub. No.: WO2017/135714
PCT Pub. Date: Aug. 10, 2017

(65) Prior Publication Data
US 2019/0015824 A1  Jan. 17, 2019

(30) Foreign Application Priority Data

Feb. 4, 2016 (KR) .................. 10-2016-0014210
Feb. 4, 2016 (KR) .................. 10-2016-0014229

(51) Int. Cl.
*B01J 35/00* (2006.01)
*B01J 35/04* (2006.01)
(Continued)

(52) U.S. Cl.
CPC .............. *B01J 35/04* (2013.01); *B01D 53/94* (2013.01); *B01D 53/9404* (2013.01);
(Continued)

(58) Field of Classification Search
CPC . B01J 35/04; B01J 21/06; B01J 21/063; B01J 23/10; B01J 23/22; B01J 23/30;
(Continued)

(56) References Cited

U.S. PATENT DOCUMENTS

2013/0028808 A1* 1/2013 Kim .................. B01D 53/94
422/171
2015/0240691 A1* 8/2015 Kleuderlein .......... F01N 13/017
211/59.4

FOREIGN PATENT DOCUMENTS

JP      07171410        7/1995
JP      08229410        9/1996
(Continued)

OTHER PUBLICATIONS

International Search Report—PCT/KR2017/001160 dated Apr. 27, 2017.

*Primary Examiner* — James A Fiorito
(74) *Attorney, Agent, or Firm* — Cantor Colburn LLP

(57) ABSTRACT

Provided is a catalyst carrier module for a large-capacity catalyst reactor, which can be assembled in a large-capacity structure by laminating a flat plate and a wave plate to be fixed in a can without brazing the flat plate and the wave plate constituting a cell forming body, for use in a catalytic reactor requiring a large-capacity exhaust gas treatment. The catalyst carrier module (or block) includes: a can of a rectangular tube shape having an inlet and an outlet; at least one cell forming body in which a plurality of hollow cells are formed by alternately laminating a wave plate and a flat plate which are coated with a catalyst on a surface thereof and inserted into the can; and a fixing unit installed at the inlet and the outlet of the can to prevent the at least one cell forming body from detaching from the can.

5 Claims, 8 Drawing Sheets

(51) Int. Cl.

| | | |
|---|---|---|
| *B01J 23/22* | (2006.01) | |
| *B01J 23/30* | (2006.01) | |
| *F01N 3/28* | (2006.01) | |
| *B01J 32/00* | (2006.01) | |
| *B01D 53/94* | (2006.01) | |
| *B01J 21/06* | (2006.01) | |
| *F01N 13/00* | (2010.01) | |
| *B01J 23/10* | (2006.01) | |
| *B01J 23/34* | (2006.01) | |
| *B01J 23/42* | (2006.01) | |
| *B01J 23/44* | (2006.01) | |
| *B01J 23/46* | (2006.01) | |
| *B01J 23/50* | (2006.01) | |
| *B01J 23/72* | (2006.01) | |
| *B01J 23/75* | (2006.01) | |
| *B01J 23/755* | (2006.01) | |

(52) U.S. Cl.
CPC .............. *B01J 21/06* (2013.01); *B01J 21/063* (2013.01); *B01J 23/10* (2013.01); *B01J 23/22* (2013.01); *B01J 23/30* (2013.01); *B01J 23/34* (2013.01); *B01J 23/42* (2013.01); *B01J 23/44* (2013.01); *B01J 23/462* (2013.01); *B01J 23/464* (2013.01); *B01J 23/50* (2013.01); *B01J 23/72* (2013.01); *B01J 23/75* (2013.01); *B01J 23/755* (2013.01); *B01J 32/00* (2013.01); *F01N 3/28* (2013.01); *F01N 3/281* (2013.01); *F01N 3/2842* (2013.01); *F01N 13/017* (2014.06); *F01N 2330/02* (2013.01); *F01N 2450/22* (2013.01); *F01N 2510/06* (2013.01)

(58) Field of Classification Search
CPC ... B01J 23/34; B01J 23/42; B01J 23/44; B01J 23/462; B01J 23/464; B01J 23/50; B01J 23/72; B01J 23/75; B01J 23/755; B01J 32/00; F01N 13/017; F01N 3/28; F01N 3/281; F01N 3/2842; B01D 53/94; B01D 53/9404
See application file for complete search history.

(56) References Cited

FOREIGN PATENT DOCUMENTS

| | | |
|---|---|---|
| JP | 10103048 | 4/1998 |
| JP | 2000334313 | 12/2000 |
| KR | 200447315 | 1/2010 |
| KR | 20120117426 | 10/2012 |
| KR | 101200078 | 11/2012 |
| KR | 20140064358 | 5/2014 |
| KR | 101582964 | 1/2016 |

\* cited by examiner

CATALYST CARRIER MODULE FOR LARGE-CAPACITY CATALYTIC REACTOR

TECHNICAL FIELD

The present disclosure relates to a catalyst carrier module for a large-capacity catalyst reactor, and more particularly, to a catalyst carrier module for a large-capacity catalyst reactor, which can be assembled in a large-capacity structure and fixed without brazing a flat plate and a wave plate constituting a cell forming body, to thereby manufacture the catalyst carrier module with a simple process and at low cost.

BACKGROUND ART

Pollutants such as nitrogen oxides, sulfur oxides, carbon monoxide, and hydrocarbons contained in exhaust gas are a great threat to the human environment. Countries are also strengthening regulations on harmful exhaust gas or accelerating the development of technologies for reducing harmful emissions.

Automobiles with the largest emissions have a direct impact on the on-the-ground environment in which humans live. As a result, regulatory demands have been high and treatment technologies have been advancing early. However, regulation of exhaust gas of ships has been relatively recently started and International Maritime Organization (IMO) and advanced countries are actively preparing countermeasures.

In 1973, the IMO adopted the International Convention for the Prevention of Pollution from Ships (MARPOL) as an international convention on marine pollution prevention from ships. Here, it refers to the marine engine exhaust nitrogen oxide regulatory program in which the emissions of nitrogen oxides (NOx) from vessels are reduced by 20% from Annex II (Tier II), which started from 2011, and are reduced by 80% from Annex III (Tier III), which started from 2016. Therefore, in a large-sized marine industry using a large-sized engine, researches on a large-capacity catalytic converter for purifying nitrogen oxides and the like contained in the exhaust gas are being actively carried out.

In the field of NOx reduction among green ship exhaust gas treatment technologies to respond to environmental regulations related to shipbuilding and shipping industry of IMO, a selective catalytic reduction (SCR) system with proven performance, safety and economic efficiency is getting popular.

The SCR system includes a reactor equipped with a honeycomb structure catalyst carrier. The catalyst carrier induces the exhaust gas mixed with NOx and ammonia ($NH_3$) to generate nitrogen and water through a reduction reaction. As a material of the catalyst carrier, a ceramic extruded material which is easy to be mass-produced at low cost has been devised, but the use of a metal carrier which can be manufactured with a thin thickness and has excellent mechanical properties is also increasing.

Unlike an automobile, a very large engine such as a ship or a plant sharply increases exhaust gas emissions, and thus the size of a selective catalytic reduction system also increases so much that a larger size of carrier is required. In terms of production, an integrated catalyst carrier having a large size by merely increasing its size has a problem in manufacturability such as a lack of equipment for producing the same, and coating of the catalyst is also difficult.

In order to solve this problem, a method of fabricating a catalyst carrier in a module form and assembling the catalyst carrier has been proposed. Such modular fabrication and assembly structures are important not only for production but also for maintenance and replacement of the carrier.

Korean Patent Application Publication No. 10-2012-0117426 (Patent Document 1) discloses a structure in which a large-capacity catalyst carrier is manufactured in the form of a unit catalyst carrier block and then assembled, but has a complicated structure having a lot of fastening points in which an assembly member is an element center for being engaged between adjacent unit catalyst carrier blocks.

In addition, the unit catalyst carrier block of Patent Document 1 includes a support for accommodating and inserting cell forming bodies as a polygonal structure in which each of the cell forming bodies having a plurality of hollow cells corresponds to the shape of the cell forming bodies by a wave plate/flat plate assembly fabricated from a wave plate and a flat plate made of a thin metal plate coated with a catalyst on the surface thereof.

Furthermore, conventional metal carriers implemented by using the wave plate/flat plate assembly fabricated from a wave plate and a flat plate made of a thin metal plate coated with a catalyst on the surface thereof use an integrated wave plate/flat plate assembly fabricated by using a joining method such as brazing, welding, soldering, and diffusion bonding, thereby causing low productivity and making it difficult to secure price competitiveness.

When the metal carrier module used in a catalytic reactor for an automobile or a home appliance is laminated and fixed without bonding a wave plate and a flat plate, it is difficult to apply the metal carrier module to the automobile or home appliance, because the metal carrier module resonates with a vibration generated in an engine or a motor in operation, to thus generate noise. However, in the case of large ships or power generation facilities, such noise is not a problem.

Korean Patent Application Publication No. 10-2014-0064358 (Patent Document 2) discloses a winding type metal carrier for forming a large-capacity catalyst carrier, which is wound around one axis so that a flat plate and a wave plate are alternately arranged, in which the flat plate and the wave plate include a polygonal winding section formed to have a polygonal section for each winding and a core section inserted into the center of the polygonal winding section and formed in a wound form.

The winding type metal carrier of Patent Document 2 is intended to reduce the weight of the carrier, reduce the welding cost, and improve the workability by omitting an outer can or a housing and fixing the flat plate and the wave plate in a polygonal winding state.

However, since the metal carrier of Patent Document 2 has a winding-type structure, and has the structure that the core portion is separately fabricated and assembled, there is a limit to the productivity improvement.

Meanwhile, the exhaust gas discharged from an automobile, an electric appliance, or a large-scale plant such as a power plant or an incinerator contains a pollutant such as sulfur oxides, carbon monoxide and hydrocarbon in addition to nitrogen oxides.

The large-scale catalytic reactor can be applied to a selective catalytic reduction (SCR) system for reducing nitrogen oxides (NOx) according to a catalyst coated on a metal carrier, can be applied to an exhaust gas catalytic converter for simultaneously reacting with carbon monoxide (CO), nitrogen oxides (NOx) and hydrocarbons (HC) based compounds contained in the exhaust gas in an automobile when using a three way catalyst of Pt/Rh, Pd/Rh or Pt/Pd/Rh and removing these compounds, can be applied to a catalytic reactor that is used in a reformer of a fuel cell to induce a chemical reaction of hydrocarbons or the like.

DISCLOSURE

Technical Problem

Accordingly, the present disclosure has been made to solve the above-mentioned problems occurring in the prior art, and it is an object of the present disclosure to provide a catalyst carrier module for a large-capacity catalyst reactor, in which a unit carrier module (or block) can be assembled efficiently in a large-capacity structure while being manufactured at a lower cost for use in catalytic reactors requiring large-scale exhaust gas treatment such as large-sized ships, power plants, and large plants such as incinerators.

It is another object of the present disclosure to provide a catalyst carrier module for a large-capacity catalyst reactor, capable of simplifying a manufacturing process and reducing manufacturing costs by braising a wave plate and a flat plate and assembling the braised wave plate and flat plate in a can in a state in which the wave plate and the flat plate are alternately stacked without forming an integrated wave plate/flat plate assembly.

It is a further object of the present disclosure to provide a catalyst carrier module for a large-capacity catalyst reactor, capable of simplifying an assembly process and heightening productivity, in which first and second extending portions are integrally formed at one side of a can to prevent cell forming bodies from being separated from the can, and fixing bars are installed in overhang areas after inserting the cell forming bodies in the can at the other side of the can to fix the cell forming bodies.

Technical Solution

According to one aspect of the present disclosure, there is provided a catalyst carrier module (or block) comprising: a can of a rectangular tube shape having an inlet and an outlet; at least one cell forming body in which a plurality of hollow cells are formed by alternately laminating a wave plate and a flat plate which are coated with a catalyst on a surface thereof and inserted into the can; and a fixing unit installed at the inlet and the outlet of the can to prevent the at least one cell forming body from detaching from the can.

The fixing unit may include a plurality of fixing bars installed at the inlet and the outlet of the can to prevent the at least one cell forming body from being detached from the can.

In this case, each of the plurality of fixing bars may be fixed to both sides of the can using a fastening member, or may be bonded to the can by one of brazing, welding, soldering, and diffusion bonding.

In addition, the fixing unit may include first to fourth fixing members both sides of which extend from both the inlet and the outlet of the can, and then are bent at 180 degrees to prevent detachment of the cell forming body from the can.

Further, the fixing unit may include: first and second extension bending portions both sides of which extend from the inlet of the can and then are bent at right angles to prevent detachment of the at least one cell forming body from the can; and third and fourth extension bending portions both sides of which extend from the outlet of the can and then are bent at right angles to prevent detachment of the at least one cell forming body from the can.

In addition, the fixing unit may include: a fixing slot formed to penetrate a side surface of the can; and a wedge member that is fitted to the fixing slot and that fixes between a first can and a second can, which are aligned adjacent to each other, to simultaneously prevent detachment of the at least one cell forming body inserted into the first can and the second can.

Furthermore, the fixing unit may include: first and second extension bending portions both sides of which extend from the inlet or outlet of the can and then are bent at right angles to prevent the at least one cell forming body from the can; and first and second fixing portions both sides of which extend from the outlet or inlet of the can, respectively, and are bent at 180 degrees to prevent detachment of the at least one cell forming body from the can.

The fixing unit may include: first and second extension bending portions both sides of which extend from the outlet of the can and then are bent at right angles to prevent detachment of the at least one cell forming body; and first and second fixing bars installed at the inlet of the can to prevent detachment of the at least one cell forming body from the can.

The fixing unit may include first and second extension bending portions both sides of which extend from the inlet or outlet of the can and then are bent at right angles to prevent detachment of the at least one cell forming body from the can; a fixing slot formed to penetrate a side surface of the outlet or inlet of the can; and a wedge member that is fitted to the fixing slot and that fixes between a first can and a second can, which are aligned adjacent to each other, to simultaneously prevent detachment of the at least one cell forming body inserted into the first can and the second can.

The fixing unit may include a spacer member inserted between an inner surface of the can and the at least one cell forming body to fix the cell forming body.

The fixing unit may include a welding portion for welding and fixing end portions of the flat plate and the wave plate to the inner surface of the can.

The at least one cell forming body may be set shorter than the can so that overhang areas are provided at the inlet and the outlet of the can, respectively, and the fixing unit may be installed in the overhang areas.

The wedge member may include: a fitting groove portion in which side surfaces of the first can and the second can are fitted; a first fixing protrusion protruding from one side of the fitting groove portion and fixing the flat plate and the wave plate laminated to the first can; and a second fixing protrusion protruding from the other side of the fitting groove and fixing the flat plate and the wave plate laminated on the second can.

The wave plate and the flat plate of the cell forming body are obtained by coating at least one metal selected from the group consisting of platinum, palladium, rhodium, ruthenium, silver, cobalt, nickel, copper, manganese, and cerium, or one metal oxide of vanadia ($V_2O_5$), titanium dioxide ($TiO_2$), and tungsten oxide, on a thin metal plate.

Advantageous Effects

As described above, according to an aspect of the present disclosure, there is provided a catalyst carrier module for a large-capacity catalyst reactor, in which a unit carrier module (block) can be assembled efficiently in a large-capacity structure while being manufactured at a lower cost for use in catalytic reactors requiring large-scale exhaust gas treatment such as large-sized ships, large plants such as water treatment facilities or incinerators, and power plants.

In addition, according to another aspect of the present disclosure, there is provided a catalyst carrier module for a large-capacity catalyst reactor, capable of simplifying a manufacturing process and reducing manufacturing costs by braising a wave plate and a flat plate and assembling the braised wave plate and flat plate in a can in a state in which the wave plate and the flat plate are alternately stacked without forming an integrated wave plate/flat plate assembly.

In addition, according to another aspect of the present disclosure, there is provided a catalyst carrier module for a large-capacity catalyst reactor, capable of simplifying an assembly process and heightening productivity, in which first and second extending portions are integrally formed at one side of a can to prevent at least one cell forming body from being separated from the can, and fixing bars are installed in an overhang area at the other side of the can to fix the cell forming body after inserting the at least one cell forming body in the can.

BEST MODE

Figure 1:
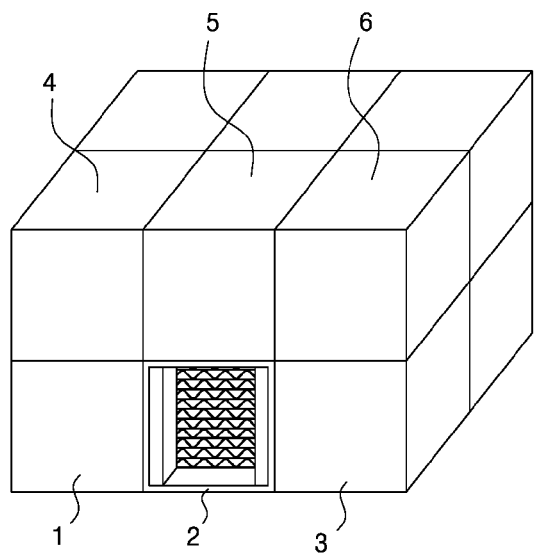
FIG. 1 is a schematic perspective view illustrating a large-capacity catalyst carrier assembled using a catalyst carrier module according to the present disclosure.

Hereinafter, embodiments of the present disclosure will be described in detail with reference to the accompanying drawings. The sizes and shapes of the components shown in the drawings may be exaggerated for clarity and convenience.

A large-capacity catalytic reactor is installed at a rear end of an engine or furnace of a large ship, a power plant, or a large plant such as an incinerator, so that exhaust gas mixed with nitrogen oxide (NOx) and ammonia ($NH_3$) is generated into nitrogen and water through a reduction reaction.

Referring to FIG. 1, a large-capacity catalyst carrier is formed by stacking a plurality of catalyst carrier modules (blocks) 1 to 6 in left and right and up and down directions. The plurality of catalyst carrier modules 1 to 6 may be fixed using an adjacent catalyst carrier module and an unillustrated assembly structure during system assembly to construct a large-capacity catalyst reactor.

The plurality of catalyst carrier modules (blocks) 1 to 6 may be formed in a polygonal shape, preferably a square or a rectangle, in cross-section, so that the catalyst carrier modules 1 to 6 can be easily assembled in a multi-structure, and then the plurality of catalyst carrier modules (blocks) 1 to 6 are easily assembled to form a large-capacity catalytic reactor.

The catalyst carrier modules 1 to 6 are disposed between exhaust pipes, and catalyst carriers for supporting a catalyst in the catalyst carrier modules 1 to 6 may be arranged in a multi-stage or single-stage configuration.

Figure 2:
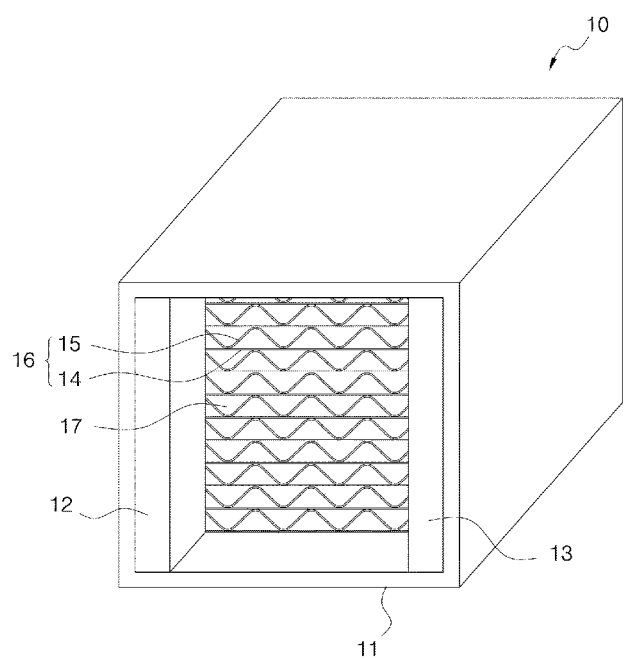
FIG. 2 is a perspective view illustrating a catalyst carrier module for a large-capacity catalyst reactor according to a first embodiment of the present disclosure.
Figure 3:
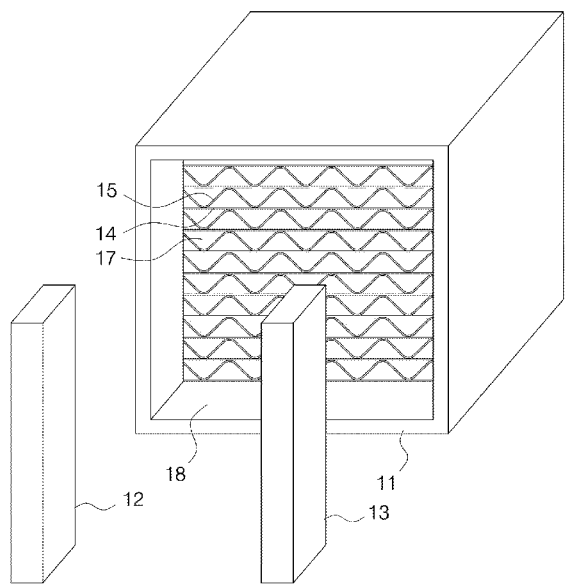
FIG. 3 is a partially exploded perspective view of the catalyst carrier module according to the first embodiment of the present disclosure.

FIGS. 2 and 3, the catalyst carrier module 10 for a large-capacity catalyst reactor according to a first embodiment of the present disclosure includes a plurality of flat plates 14 and wave plates 15 constituting at least one cell forming body 16 which is laminated alternately and inserted in a can or a housing 11 having a rectangular pillar shape both ends of which are opened.

The flat plates 14 and the wave plates 15 are alternately stacked to form a plurality of hollow cells 17 parallel to the longitudinal direction through which the exhaust gas passes.

The length of the flat plate 14 and the wave plate 15, that is, the cell forming body 16 is formed to be smaller than the length of the can 11 and as a result, as shown in FIG. 3, the can 11 has overhang areas 18 at its inlet and outlet, respectively. The overhang areas 18 are set so that it can be used when the catalyst carrier modules 10 are assembled together.

In the overhanging areas 18 provided at the inlet and the outlet of the can 11, a fixing member or a fixing unit for fixing the at least one cell forming body 16 inserted in the can 11 are fixed to the can 11 in a state in which a pair of fixing bars 12 and 13 are in close contact with inner side walls of both side surfaces of the can 11, according to the first embodiment.

When the fixing bars 12 and 13 are inserted and assembled into the overhang areas 18, one side surface of each of the fixing bars 12 and 13 is in close contact with one inner side wall of both sides of the can 11, and an inner side surface of each of the fixing bars 12 and 13 is in contact with the flat plates 14 and the wave plates 15, and thus each of the fixing bars 12 and 13 may be constituted by a rectangular bar having a predetermined length while having a rectangular or square cross section so as to prevent a flow of the at least one cell forming body 16.

That is, in the first embodiment, the fixing bars 12 and 13 are joined and fixed a joining process is executed to contact portions between each of the fixing bars 12 and 13 and the can 11 to fix the fixing bars 12 and 13 to the can 11, in a state in which the inner surfaces of the fixing bars 12 and 13 are in close contact with the at least one cell forming body 16. As the joining process, for example, one of brazing, welding, soldering, and diffusion bonding may be selected.

As illustrated in the first embodiment, when a pair of fixing bars 12 and 13 are fixed to each of the overhang areas 18 provided at the inlet and the outlet of the can 11, to thus fix the at least one cell forming body 16 inserted into the can 11, it is possible to omit a conventional brazing joining process for joining the flat plate 14 and the wave plate 15 to integrate the flat plate 14 and the wave plate 15 so that the productivity can be improved and the manufacturing cost can be reduced.

Figure 4:
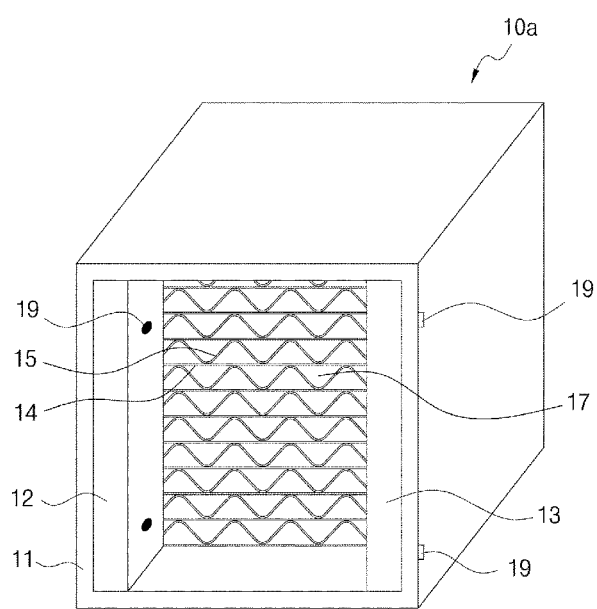
FIG. 4 is a perspective view illustrating a catalyst carrier module for a large-capacity catalyst reactor according to a second embodiment of the present disclosure.

FIG. 4 illustrates a catalyst carrier module 10a for a large-capacity catalyst reactor according to a second embodiment of the present disclosure.

The catalyst carrier module 10a of the second embodiment is different from that of the first embodiment in view of providing the method of fixing the pair of fixing bars 12 and 13 to the vertical walls on both sides of the can 11, and the second embodiment is the same as the first embodiment, in view of the other parts. Therefore, the same reference numerals are assigned to the same parts as those in the first embodiment, and a detailed description thereof will be omitted.

In the second embodiment, when fixing the pair of fixing bars 12 and 13 to the inner side walls of both sides of the can 11, physical fastening members 19 such as, for example, bolts, nuts, rivets, fixing screws, or the like, may be used at the upper and lower portions of the fixing bars 12 and 13 instead of brazing or welding, so as to be fixed on both side surfaces of the can 11.

Throughholes are formed on both side surfaces of the pair of fixing bars 12 and 13 and the can 11 such that the fastening members 19 pass through.

When the pair of fixing bars 12 and 13 are fixed to both inner side surfaces of the can 11 using the fastening member 19 as in the second embodiment, the at least one cell forming body 16 inserted in the inside of the can 11 may be easily fixed in the same manner as the first embodiment.

As illustrated in the second embodiment, identically to the first embodiment, when a pair of fixing bars 12 and 13 are fixed to each of the overhang areas 18 provided at the inlet and the outlet of the can 11, to thus fix the at least one cell forming body 16 in the can 11, it is possible to omit a conventional brazing joining process for joining the flat plate 14 and the wave plate 15 to integrate the flat plate 14 and the wave plate 15 so that the productivity can be improved and the manufacturing cost can be reduced.

The catalyst carrier module according to the first and second embodiments has a structure in which a plurality of flat plates 14 and wave plates 15 are alternately stacked to form cell forming bodies 16, and a plurality of hollow cells 17 are respectively formed between the flat plate 14 and the wave plate 15 in the longitudinal direction.

The wave plates 15 are formed in a wave shape or a concavo-convex shape, and the flat plates 14 are formed in a flat plate shape. When the wave plates 15 and the flat plates 14 are alternately stacked in the can 11, the plurality of hollow cells 17 are formed. Each of the hollow cells 17 is formed in one of various shapes such as a wave shape, a hemisphere shape, a honeycomb shape, a triangle shape, and a square shape depending on the shape of the wave plates 15.

The flat plates 14 and the wave plates 15 may be formed of a metal material such as a refractory metal thin plate such as FeCrAl or stainless steel, for example.

The wave plates 15 are formed by subjecting the flat plates 14 to corrugation processing. Throughholes may be formed so that the flow of the exhaust gas may be performed between the cells 17 as required.

A catalyst layer is coated on the surfaces of the wave plates 15 and the flat plates 14 to reduce nitrogen oxides and the like contained in the exhaust gas. The wave plates 15 and the flat plates 14 are formed of a thin metal plate having a thickness of about 20 μm to about 100 μm and a catalyst metal, respectively, in which at least one metal selected from the group consisting of platinum, palladium, rhodium, ruthenium, silver (including silver nano), cobalt, nickel, copper, manganese and cerium, or metal oxides such as vanadia ($V_2O_5$), titanium dioxide ($TiO_2$), and tungsten oxide may be used as the catalyst metal.

The cell forming bodies 16 of the catalyst carrier module are set to a catalyst activation temperature of about 200° C. to about 600° C., for example, depending on the kind of the catalyst metal.

Figure 5:
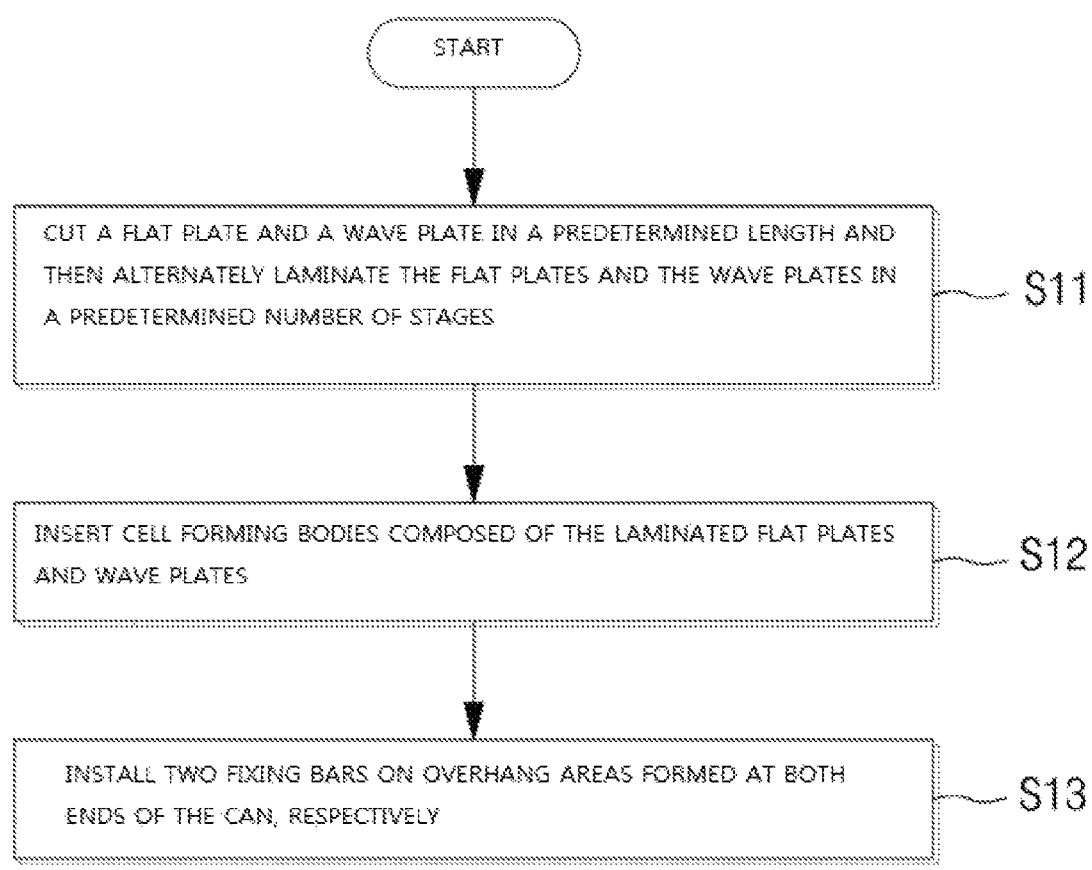
FIG. 5 is a flow chart illustrating a method of manufacturing a catalyst support module for a large-capacity catalyst reactor according to an embodiment of the present disclosure.

FIG. 5 is a flowchart view for explaining a method of manufacturing a metal carrier according to an embodiment of the present disclosure.

First, the flat plate 14 and the wave plate 15, which are formed of a thin metal plate and coated with a catalyst, are cut into a predetermined length by a continuous process, and then a predetermined number of the flat plates 14 and the wave plates 15 are alternately stacked thereby forming cell forming bodies 16 (S11). The flat plates 14 and the wave plates 15 are set shorter than the length of the can 11.

Then, the cell forming bodies 16 are inserted into the can 11 in the form of a rectangular tube (S12). The can 11 has a rectangular or square sectional shape, which is advantageous for being stacked and assembled in a multi-stage structure while accommodating the cell forming bodies 16, but it is also possible to have a trapezoidal shape. In addition, the can 11 may be formed in a polygonal shape such as a pentagon, a hexagon, or an octagon.

Thereafter, a pair of fixing bars 12 and 13 are fixed, by welding or the like, to the overhang areas 18 formed at both ends of the can 11 in which the cell forming bodies 16 are inserted. Otherwise, the fixing bars 12 and 13 are fixed to the inner wall surfaces of the can 11 using the fastening members 19 (S13).

In this case, the cell forming bodies 16 can be fixed to the inside of the can 11 by installing the fixing bars 12 and 13 in the same way in the outlet 35 as well as the inlet 35 of the can 11.

In addition, as in a catalyst carrier module 10b for a large-capacity catalytic reactor according to a third embodiment shown in FIG. 6, which will be described later, it is possible to install fixing bars 12 and 13 in an inlet at one side of a can 31, and it is also possible to extend, at an outlet 36 of the can 31, a pair of extending bends 33 and 34 from the left and right sides of the can 31 to serve as a stopper.

Figure 6:
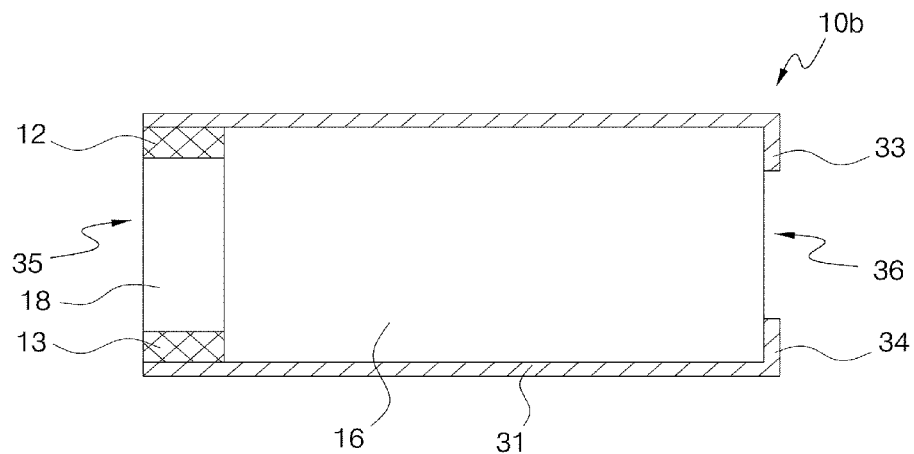
FIG. 6 is a longitudinal cross-sectional view of a catalyst carrier module for a large-capacity catalyst reactor according to a third embodiment of the present disclosure.
Figure 7:
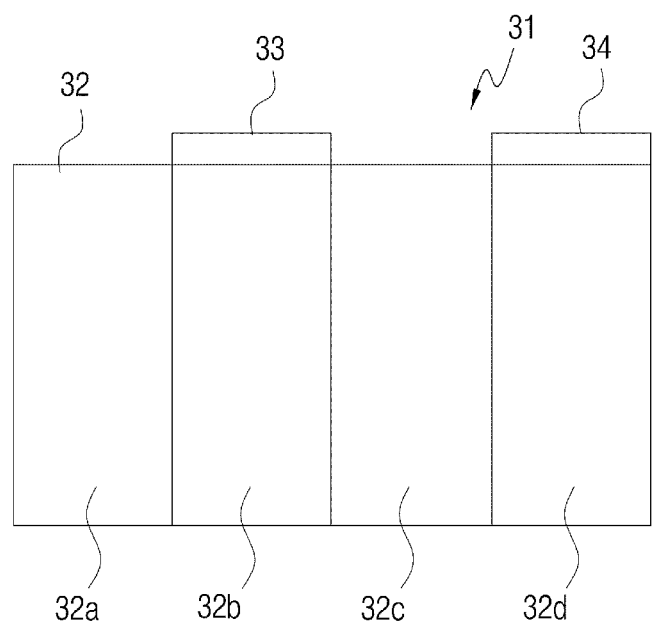
FIG. 7 is an exploded view of a can for the catalyst carrier module according to the third embodiment of the present disclosure.

FIG. 6 is a longitudinal cross-sectional view of a catalyst carrier module for a large-capacity catalyst reactor according to the third embodiment of the present disclosure. FIG. 7 shows an exploded view of a can used in the catalyst carrier module of the third embodiment.

The catalyst carrier module 10b for a large-capacity catalytic reactor according to the third embodiment of the present disclosure is characterized in that an overhang area 18 is formed in an inlet 35 at one side of the can 31 in which the cell forming bodies 6 are inserted, but first and second extension bends 33, 34 extending from the can at both sides of an outlet 36 are bent at right angles.

As in the exploded view of the can illustrated in FIG. 7, the can 31 according to the third embodiment includes side surfaces 32a-32d forming four sides of a rectangular tube and first and second extending bends 33 and 34 extended from two side surfaces and bent at right angles. Therefore, when the can 31 shown in the exploded view is assembled to form a rectangular tube, the first and second extending bends 33 and 34 protrude from the two opposite side surfaces, and the first and second extending bends 33 and 34 are bent at right angles to the side portions 32b and 32d.

When the catalyst carrier module 10b is assembled, the cell forming bodies 16 are inserted in the can 31 until the leading end of the cell forming bodies 16 are in contact with the two extension bends 33 and 34 from the inlet 35 in which the overhang area 18 is formed, in which the flat plates 14 and the wave plates 15 are alternately stacked, and the fixing bars 12 and 13 are fixed to the inner side walls of the can 31 on both sides of the inlet 35, to thus complete the assembly simply.

The third embodiment can omit the step of fixing the fixing bars 12 and 13 to one side when the first and second extending bends 33 and 34 are formed together in the process of forming the can 31, so that the assembling process can be shortened.

In addition, in the can 31 of the third embodiment, the outlet side of the can prevent the cell forming bodies 16 inserted in the can from being separated by the first and second extending bends 33 and 34, and thus the process of inserting the cell forming bodies 16 can be easily handled and automation can be easily applied.

In the above-described first to third embodiments, two fixing bars 12 and 13 are provided in an inlet at one side of the can, but they may be installed at three or four sides.

Figure 8:
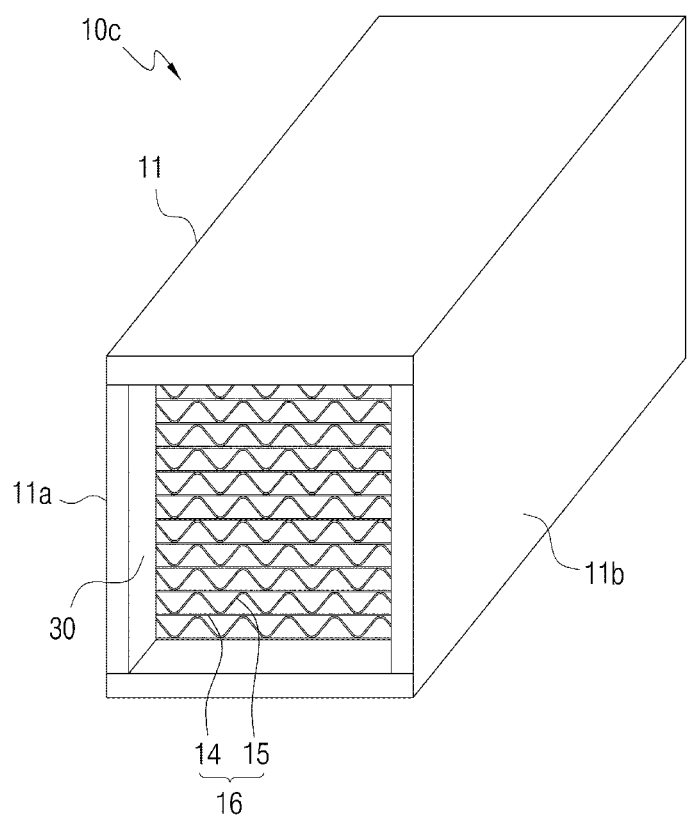
FIG. 8 is a perspective view of a catalyst carrier module for a large-capacity catalyst reactor according to a fourth embodiment of the present disclosure.
Figure 9A:
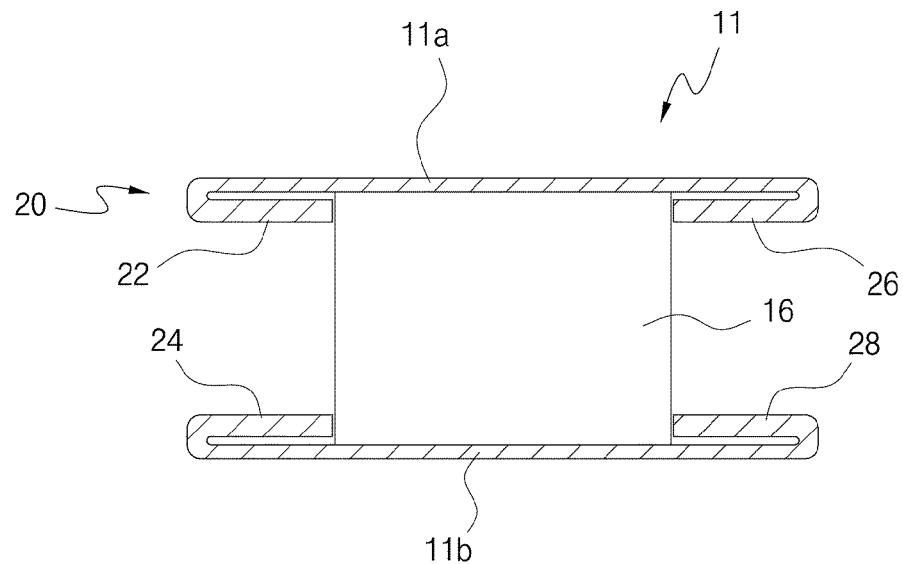
FIG. 9A is a cross-sectional view of the catalyst carrier module for a large-capacity catalyst reactor according to the fourth embodiment of the present disclosure shown in FIG. 8.
Figure 9B:
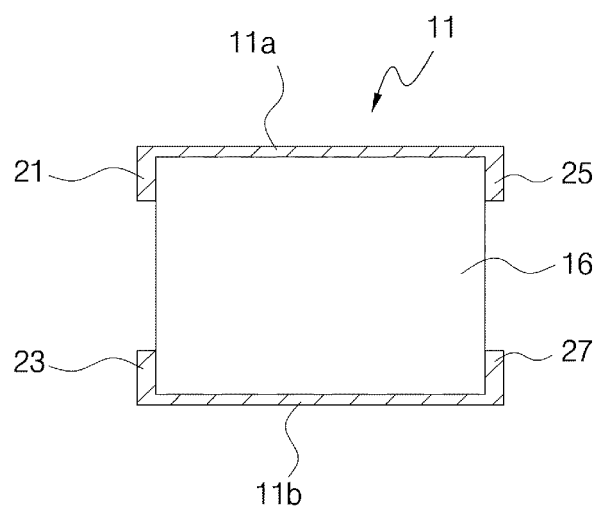
FIG. 9B is a cross-sectional view of the catalyst carrier module for a large-capacity catalyst reactor according to the fourth embodiment of the present disclosure shown in FIG. 8.

FIG. 8 is a perspective view of a catalyst carrier module for a large-capacity catalyst reactor according to a fourth embodiment of the present disclosure. FIGS. 9A and 9B are longitudinal cross-sectional views of a catalyst carrier module according to the fourth embodiment of the present disclosure, respectively.

As shown in FIGS. 8 and 9A, a catalyst carrier module 10c according to the fourth embodiment of the present disclosure includes a cylindrical can 11 having both sides thereof passed therethrough, and cell forming bodies 16 inserted in the can 11 in which a flat plate 14 and a wave plate 15 are alternately stacked in one cell forming body 16.

The can 11 is in the form of a rectangular tube with both ends open so that the cell forming bodies 16 having a rectangular cross section can be accommodated, and both ends thereof are connected to an exhaust pipe (not shown).

Since the flat plate 14 and the wave plate 15 according to the fourth embodiment of the present disclosure are not subjected to a separate brazing process, they are alternately laminated inside the can 11 without being bonded to each other. Therefore, a fixing unit is added to the can 11 so that the flat plate 14 and the wave plate 15, which are not bonded to each other, can be maintained in a fixed state without being separated from the can 11.

As shown in FIG. 9A, the fixing unit according to the fourth embodiment includes extension fixing portions 20 which are formed so as to extend from the can 11 in the form of a rectangular bar and bent at an angle of 180 degrees inward of the can 11, and the end portions of which are in contact with edge portions of the flat plates 14 and the wave plates 15 to keep the flat plates 14 and the wave plates 15 in a laminated state and in an accommodated state in the can 11.

The extension fixing portions 20 is integrally formed with the can 11 so that the flat plates 14 and the wave plates 15 are alternately stacked in the can 11 and then the extension fixing portions 20 are bent at an angle of 180 degrees, and then the end portions (that is, the leading ends) of the extension fixing portions 20 are engaged with the edges of the flat plates 14 and the wave plates 15 to fix the flat plates 14 and the wave plates 15.

The extension fixing portions 20 specifically include a first fixing portion 22 which is extended from a front end of a first side surface 11a of the can 11 and then bent at 180 degrees, a second fixing portion 24 which is extended from a front end of a second side surface 11b of the can 11 disposed to face the first side surface 11a and then bent at 180 degrees, a third fixing portion 26 which is extended from a rear end of the first side surface 11a of the can 11 and then bent at 180 degrees, and a fourth fixing portion 28 which is extended from a rear end of the second side surface 11b of the can 11 and then bent at 180 degrees.

In addition, as shown in FIG. 9B, a modified fixing unit according to the fourth embodiment includes first to fourth extension bends 21, 23, 25, and 27 which are integrally formed in the can 11 and bent at 90 degrees from both sides of the can 11, and the inner surfaces of which are in contact with the edges of the flat plates 14 and the wave plates 15.

Since the extension fixing portions 20 and the extension bends 21, 23, 25 and 27 according to the fourth embodiment are integrally formed with the can 11 when the can 11 is manufactured, and thus there is no need to fabricate them separately.

When the cell forming bodies 16 are assembled to the can 11, the third and fourth fixing portions 26 and 28 or the third and fourth extending bends 25 and 27 are formed on one side of the can 11, and the cell forming bodies 16 in which the flat plates 14 and the wave plates 15 are alternately stacked are inserted into the can 11 and the first and second fixing portions 22 and 24 or the first and second extension bends 21 and 23 are formed. Accordingly, the fixing of the cell forming bodies 16 is completed, so that the manufacturing process can be simplified.

Figure 10:
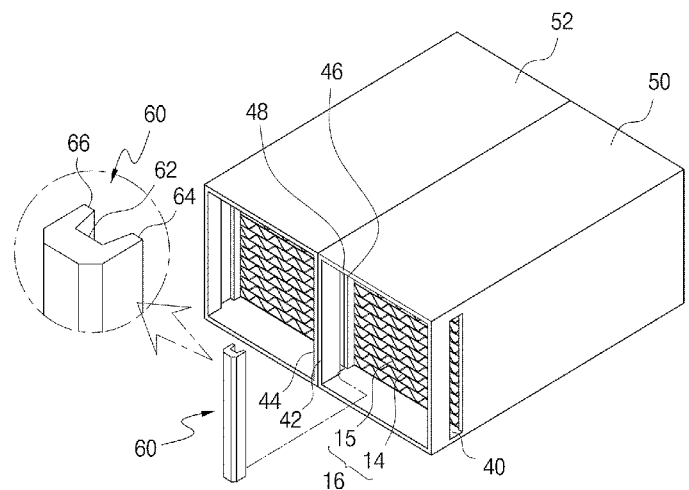
FIG. 10 is a perspective view of a catalyst carrier module for a large-capacity catalyst reactor according to a fifth embodiment of the present disclosure.
Figure 11:
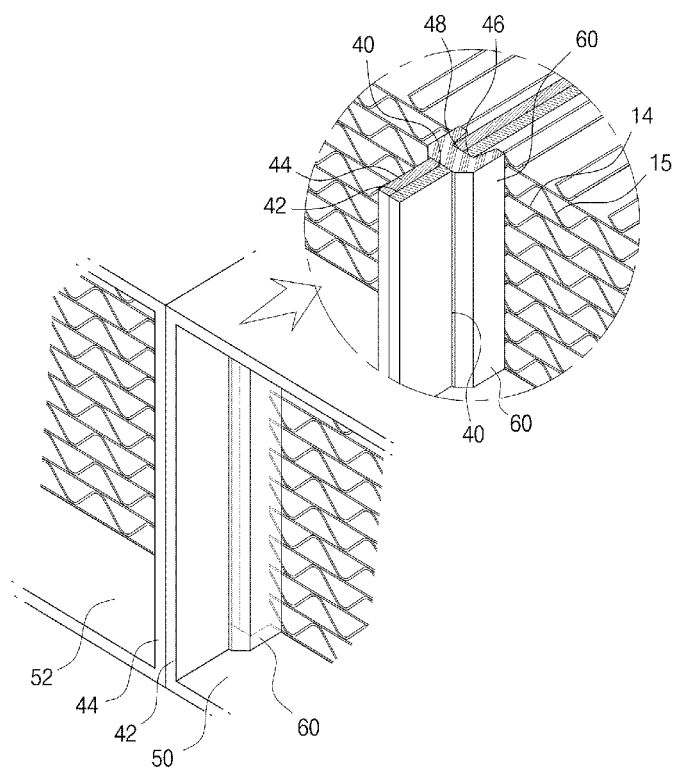
FIG. 11 is an enlarged partial perspective view of the catalyst carrier module for a large-capacity catalyst reactor according to the fifth embodiment of the present disclosure shown in FIG. 10.

As shown in FIGS. 10 and 11, a fixing unit according to a fifth embodiment includes fixing slots 40 formed to pass through the side surfaces of a first can 50 and a second can 52, respectively, and a wedge member 60 which is fitted into the fixing slots 40 so that the first can 50 and the second can 52 are fixed to each other and the cell forming bodies 16 are separated from the first can 50 and the second can 52.

When the cell forming bodies 16 are stacked in the vertical direction, for example, in the first can 50 and the second can 52, the fixing slots 40 are also formed on the side surfaces of the first can 50 and the second can 52, lengthily in the vertical direction. That is, the fixing slots 40 are lengthily formed in the same direction as the stacking direction of the cell forming bodies 16.

When the catalyst carrier module is used in a large-capacity catalyst reactor, a plurality of catalyst carrier modules are used in combination in the vertical direction or in the left-right direction.

For example, when the first catalyst carrier module and the second catalyst carrier module are arranged in the left-right direction, the first can 50 and the second can 52 are arranged in the horizontal direction, and a first side 42 of the first can 50 and a second side 44 of the second can 52 are arranged in contact with each other.

Here, a first fixing slot 46 formed in the first can 50 and a second fixing slot 48 formed in the second can 52 are arranged to communicate with each other, and the wedge member 60 is arranged to pass through the fixing slot 46 and the second fixing slot 48 to fix the first can 50 and the second can 52 together.

The wedge member 60 includes a fitting groove portion 62 to be fitted into the first can 50 and the second can 52 in a state in which the second can 52 is in contact with the first can 50, a first fixing protrusion 64 protruded from one side of the fitting groove portion 62, for fixing the cell forming bodies 16 stacked on the first can 50, and a second fixing protrusion 66 protruded from the other side of the fitting groove portion 62, for fixing the cell forming bodies 16 stacked on the second can 52.

In the case that a plurality of catalyst carrier modules are combined to form a large-capacity catalytic reactor, as described above, and when the wedge member 60 is fitted into the fixing slots 40, the catalyst carrier modules are fixed and simultaneously the flat plates 14 and the wave plates 15 which are stacked in the first can 52 and the second can 52 are fixed, to the first can 52 and the second can 52, to thereby greatly reduce the assembling process.

Figure 12:
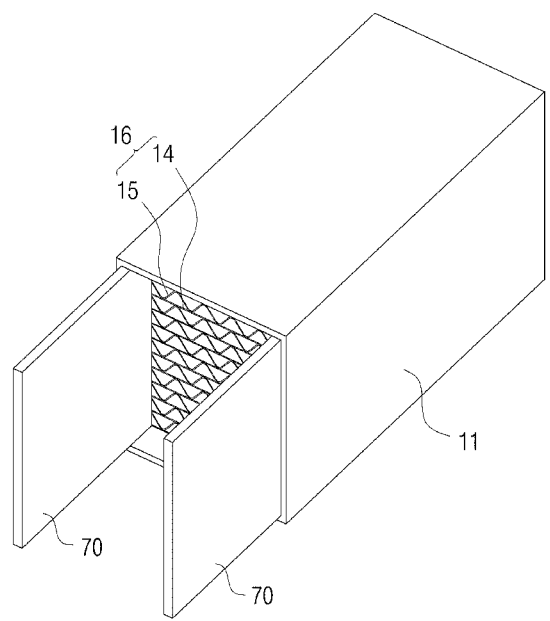
FIG. 12 is a perspective view of a catalyst carrier module for a large-capacity catalyst reactor according to a sixth embodiment of the present disclosure.

As shown in FIG. 12, a fixing unit of a catalyst carrier module according to a sixth embodiment includes spacer members 70 respectively fitted to both sides of the can 11 to fix flat plates 14 and wave plates 15.

When the spacer members 70 are formed of a heat-resistant material such as ceramic or metal and inserted into the can 11 in the longitudinal direction, the end portions of the flat plates 14 and the wave plates 15 are pressed by the spacer members 70, to thus be maintained in a state of being fixed to the can 11.

These spacer members 70 can be inserted not only on both sides of the can 11 but also on the upper and lower surfaces thereof.

Figure 13:
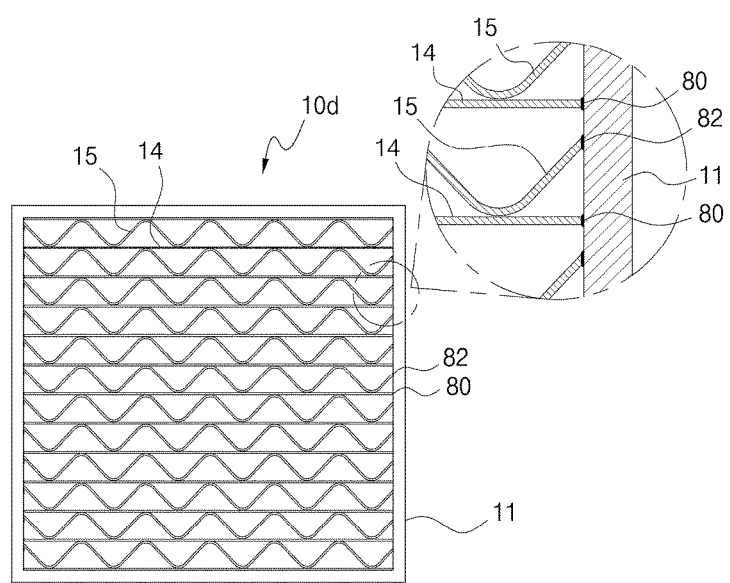
FIG. 13 is a cross-sectional view of a catalyst carrier module for a large-capacity catalyst reactor according to a seventh embodiment of the present disclosure.

As shown in FIG. 13, a fixing unit of a catalyst carrier module according to a seventh embodiment includes first welding portions 80 which are welded between the inner surface of the can 11 and each of the flat plates 14, and second welding portions 82 which are welded between the inner surface of the can 11 and each of the wave plates 15, after alternately laminating the flat plates 14 and the wave plates 15 so as to constitute cell forming bodies in the can 11.

As described above, the welding is performed only between each of the flat plates 14 and the inner surface of the can 11 and between each of the wave plates 15 and the inner surface of the can 11. Thus, as compared with the case where all the contacts between the flat plates 14 and the wave plates 15 are welded, the number of welded portions can be greatly reduced and the manufacturing process can be simplified.

In the above description of the embodiment, the fixing unit of the fourth embodiment prevents the detachment of the cell forming bodies in the same manner at both the inlet and the outlet. However, similar to the third embodiment of FIG. 6, when the fixing portions 12 and 13 or the third and fourth extending bends 25 and 27 are formed at the outlet, and the fixing bars 12 and 13 are installed at the inlet, the assembling time of the cell forming bodies can be shortened.

In addition, as needed, the third and fourth fixing portions 26 and 28 or the third and fourth extending bends 25 and 27 are formed at the outlet, and the wedge member 60 is fixed to the fixing slots 46 and 48 or the end portions of the flat plates and the wave plates are welded to the inner surfaces of the can to prevent the cell forming bodies from being separated from the can.

In the present disclosure, the fixing units according to the first to seventh embodiments can be combined with each other at the inlet and outlet of the can to prevent detachment of the cell forming bodies.

In the above description of the embodiment, the catalyst carrier module is used in a large-capacity catalytic reactor. However, the present disclosure is not limited to the large-capacity catalytic reactor but can be applied to any reactor as long as it uses a catalyst carrier module constructed by assembling wave plates and flat plates composed of a thin metal plate in the can in a state where the wave plates and flat plates are alternately stacked, without forming an integrated wave plate/flat plate assembly by brazing the wave plates and flat plates to bond each other.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

The present disclosure can be applied to a catalyst carrier module of a large-capacity catalytic reactor used in a large-sized ship, a power plant, a large plant such as an incinerator, and the like.

What is claimed is:

1. A catalyst carrier module comprising:
a can of a rectangular tube shape having an inlet and an outlet;
at least one cell forming body inserted into the can and having a plurality of hollow cells, wherein the hollow cells are formed of flat plates and wave plates, which are alternatively laminated and coated with a catalyst on a surface thereof; and
a fixing unit installed at the inlet and the outlet of the can to prevent the at least one cell forming body from detaching from the can, wherein the fixing unit comprises: a fixing slot formed in the can and passing through a side wall of the can; and a wedge member inserted into the fixing slot and configured to be capable of being inserted into a fixing slot in a side wall of an adjacent can so as to prevent detachment of the at least one cell forming body from the can and detachment of a cell forming body from the adjacent can, and simultaneously connect the can and the adjacent can to each other.

2. The catalyst carrier module of claim 1, wherein the fixing unit further comprises: welding portions for welding and fixing end portions of the flat plates and the wave plates to an inner surface of the can.

3. The catalyst carrier module of claim 1, wherein the at least one cell forming body is set shorter than the can so that an overhang area are provided at the inlet and the outlet of the can, respectively, and the fixing unit is installed in the overhang area.

4. The catalyst carrier module of claim 1, wherein the wedge member comprises:
a fitting groove portion into which the side wall of the can and the side wall of the adjacent can are inserted together;

a first fixing protrusion protruding from one side of the fitting groove portion and preventing the at least one cell forming body from being detached from the can; and a second fixing protrusion protruding from the other side of the fitting groove portion and preventing the cell forming body from the adjacent can.

5. The catalyst carrier module of claim 1, wherein the catalyst is at least one selected from the group consisting of platinum, palladium, rhodium, ruthenium, silver, cobalt, nickel, copper, manganese, and cerium, vanadia ($V_2O_5$), titanium dioxide ($TiO_2$), and tungsten oxide.

* * * * *